United States Patent Office 2,835,289
Patented May 20, 1958

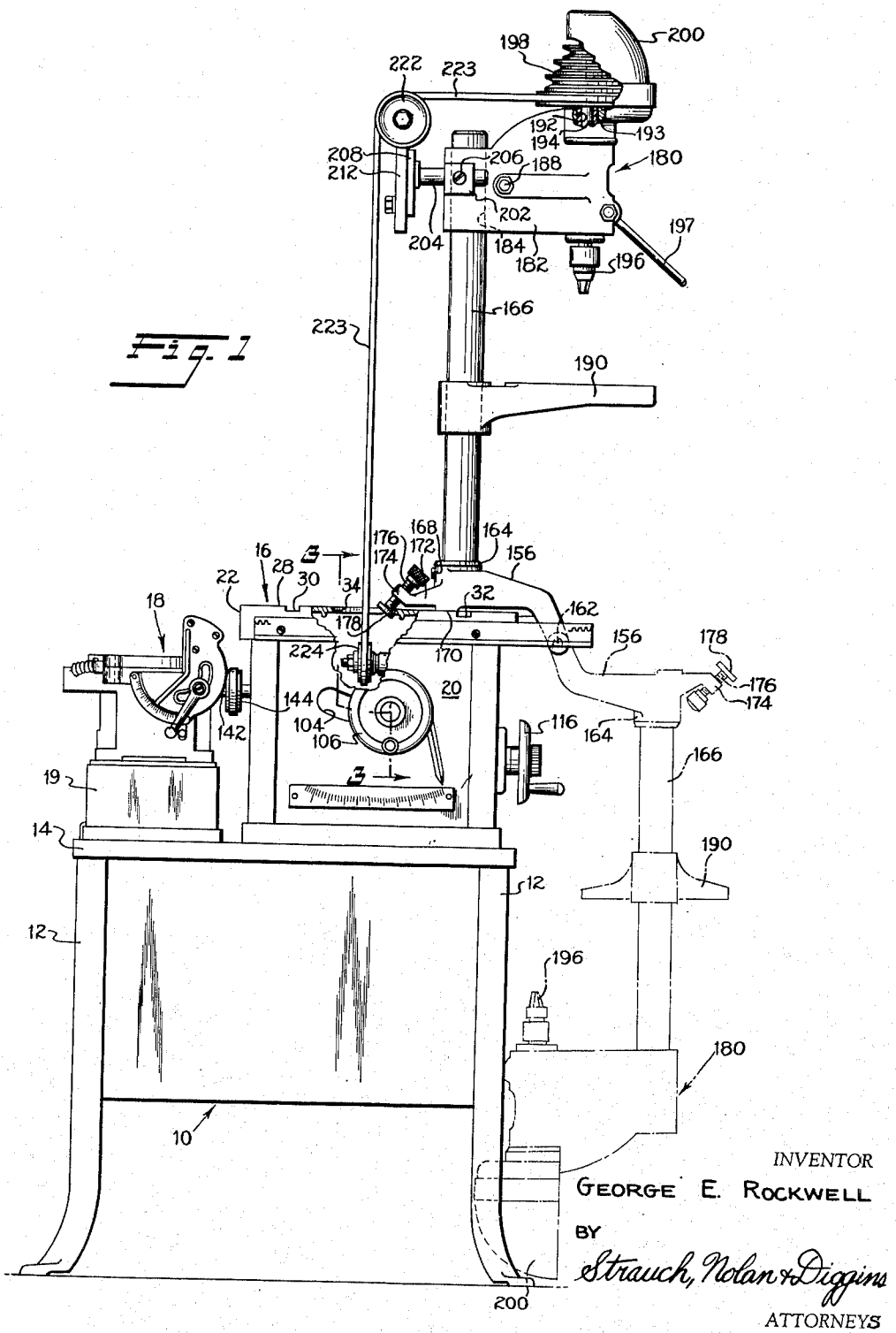

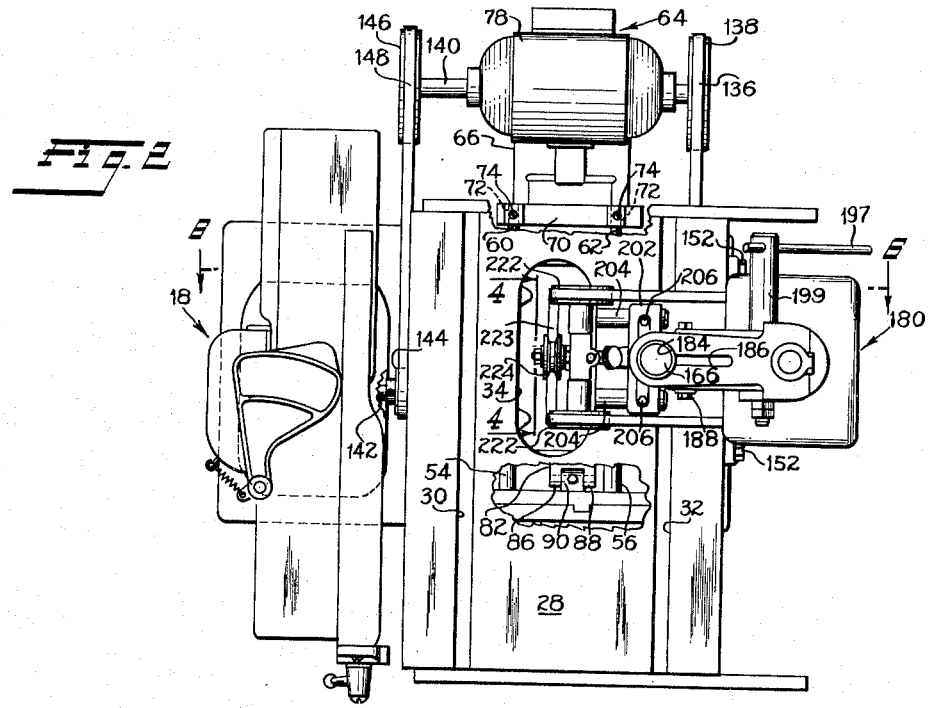
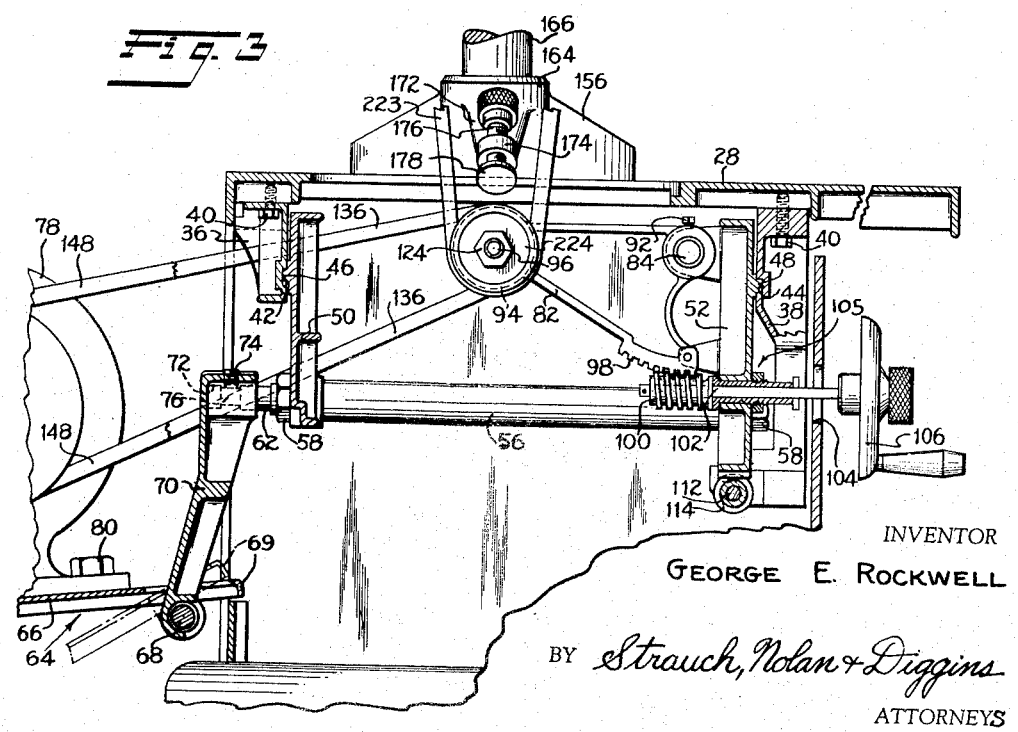

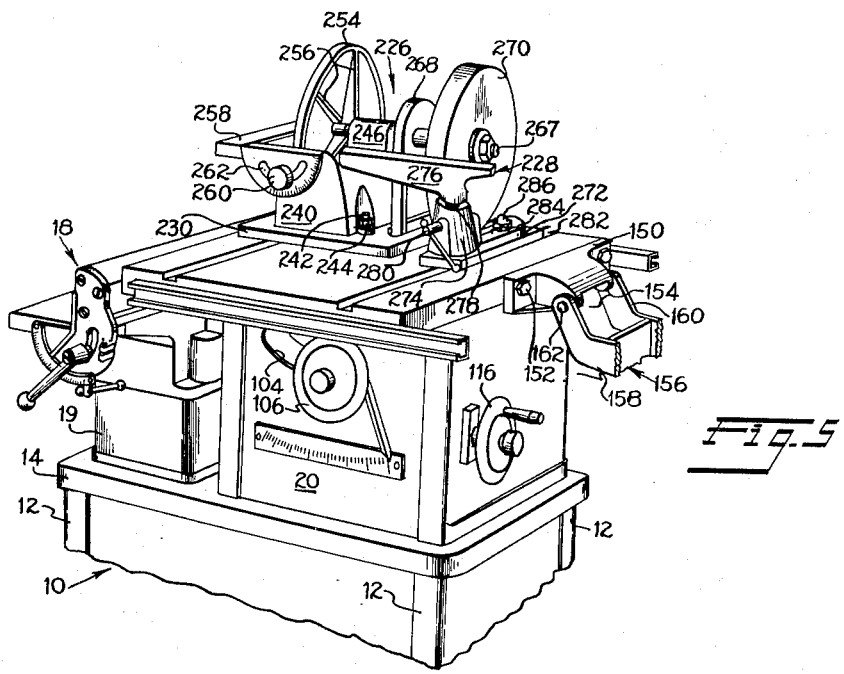
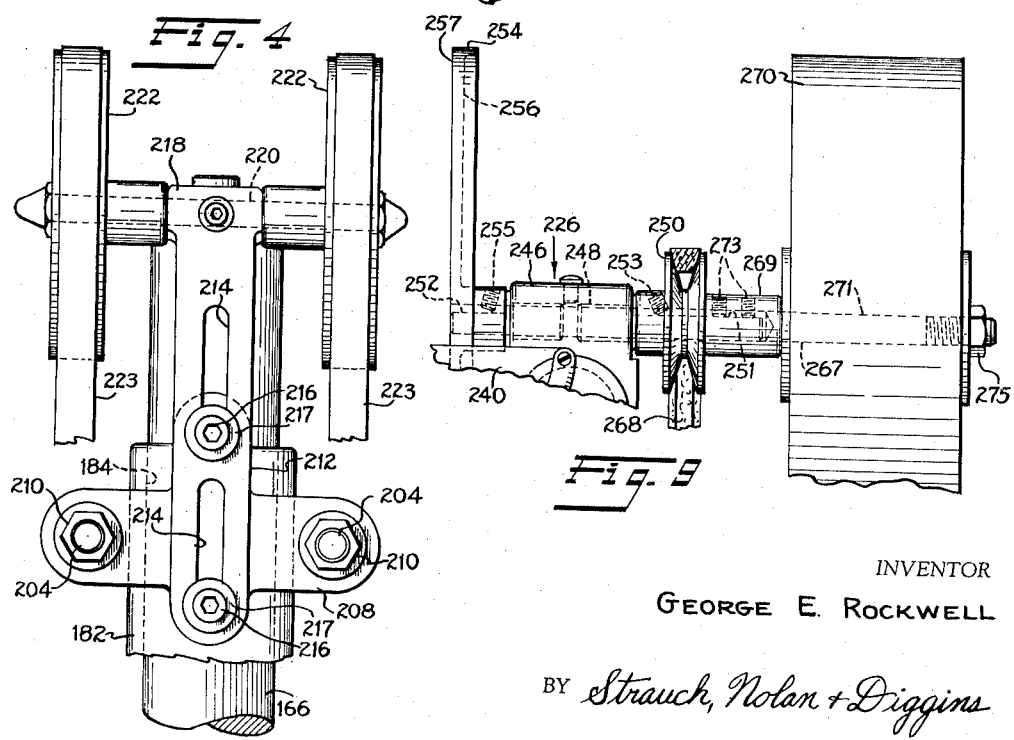

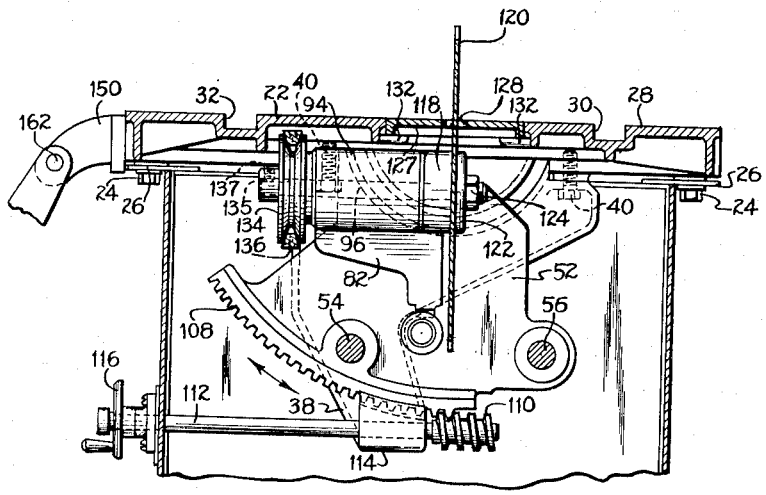
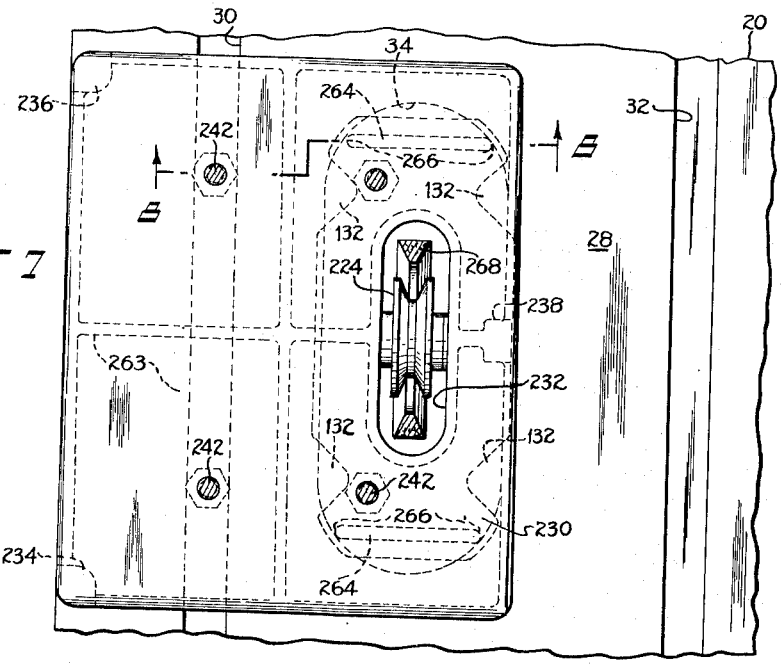
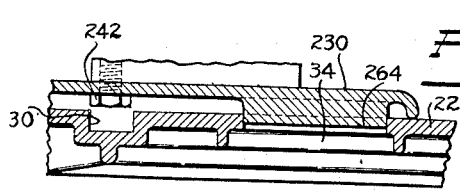

2,835,289

MULTI-TOOL POWER DRIVEN WOOD WORKING MACHINE

George E. Rockwell, Arlington, Mass.

Application March 31, 1953, Serial No. 346,002

5 Claims. (Cl. 144—1)

The present invention relates to power tools and more particularly to power tools wherein a single unitary apparatus is adapted to perform a wide variety of woodworking and related operations.

Specifically, the present invention contemplates a compact, relatively simple universal power tool which is quickly and easily adapted for sawing, drilling, planing, sanding and turning wood and also for performing such operations as buffing, grinding, dadoing, molding, scratch-brushing, and the like.

In the field of power woodworking tools and particularly in tools for non-commercial use in home workshops and the like, combination units have been heretofore proposed to enable the amateur worker to perform different machining operations with a single apparatus. However, such prior devices are subject to many limitations, impracticalities and operational difficulties which render them not completely satisfactory for the purposes of the general consumer.

Among the drawbacks encountered in existing combination units are the difficulty of conversion for various operations, the limited number of operations which can be performed, the limited size of the work which can be accommodated, high initial cost and complexity of the unit, and the inferior quality and lack of accuracy of the work performed.

Perhaps the most important basic operation performed in woodworking is sawing, and at least a majority of prior art combination tools include some provision for power sawing. In the present invention the saw may be of the tilting arbor type, having many important advantages over the prior art saws, e. g., ease and greater accuracy of adjustment and operation, larger work size capacity, greater range of adjustment on large pieces, etc.

Another objection frequently raised to prior art combination tools is the fact they do not perform each operation as well, i. e., as easily, efficiently and accurately as would be done by individual tools. The present invention, however, performs each task fully as well as could be done with comparable individual tools.

With the foregoing summary of the present state of the art in mind, the objects of the present invention are as follows:

It is a primary object of this invention to group a plurality of power tools into a unitary assembly that is extremely compact and readily adapted, through novel drive means and relative location to be driven from a single self-contained motor and selectively conditioned for use with maximum safety and minimum manipulation.

It is another important object of this invention to utilize a circular saw and its tilting arbor motor and drive mechanism as a primary drive source for a multiplicity of machine tool units most of which are adapted for operative support by the saw table and held in operative position by means of a novel drive arrangement.

It is a further general object of the invention to provide a novel combination power tool.

It is another object of the invention to provide an improved combination power tool quickly and easily adapted to perform miscellaneous operations, and driven by a single motor.

It is a further object of the invention to provide an improved combination power tool which is extremely compact and requires little more floor space than a single tool for performing any one of its operations.

It is a still further object of the invention to provide a novel combination power tool in which the basic component is a circular saw of substantial capacity to which various other components are interdependently related.

Yet another object of the invention is the provision of a novel combination power tool embodying as a basic drive source a circular saw motor and a novel drive assembly which functions not only to drive a circular saw and various other components but which also provides belt tensioning means to selectively drive a drill press, sander and lathe head attachments and to hold such attachments in operative position.

Another object of the invention is to provide a combination power tool which can be sold as a unit at relatively low cost or can be purchased as sub-assemblies from time to time and added to the unit with great ease by and at relatively slight expense to the consumer.

Still another object of the invention is to provide a novel combination tool, various components of which are adapted to be quickly and easily separated for individual use with separate stands and separate drive means.

Another general object of the invention resides in the provision of an improved combination tool which overcomes the difficulties inherent in comparable prior art devices.

Still another object of the invention resides in the provision of a novel combination power tool so constructed and arranged that the natural sequence of basic woodworking operations, e. g., saw, joint, saw, then drill and sand, may be carried out with but two quick and easy converting operations.

These and other objects and advantages of the present invention will be apparent from a reading of the following description of a preferred embodiment in conjunction with the subjoined claims and annexed drawings in which, Figure 1 is a side elevation of the combination power tool showing the drill press in operative position (solid lines) and in inoperative position (broken lines);

Figure 2 is a top plan view of the combination tool with the drill press in operative position;

Figure 3 is a sectional view with certain parts broken away taken on line 3—3 of Figure 1;

Figure 4 is a fragmental view taken on line 4—4 of Figure 2 looking in the direction of the arrows;

Figure 5 is a fragmental perspective elevation of the combination tool with various attachments in operative position on the combined work and tool support table;

Figure 6 is a sectional view taken substantially on line 6—6 of Figure 2 but with the drill press and jointer omitted and the drill press support arm broken away and in inoperative position and the unit adapted for sawing;

Figure 7 is a top plan view partly in section, of the combined work and tool support table with the base of the lathe unit in operative position;

Figure 8 is a sectional view taken on line 8—8 of Figure 7;

Figure 9 (sheet 3) is a fragmentary elevation showing certain details of Figure 5 on a larger scale.

With continued reference to the drawings and first particularly to Figure 1, reference numeral 10 indicates a base or stand including legs 12 for supporting the combination tool unit of the present invention at a convenient height above the floor. The stand 10 has a flat, rectangular top 14 on which are mounted in juxtaposition a tilting arbor saw unit and a jointer unit indicated generally by numerals 16 and 18, respectively.

The saw unit comprises a cabinet 20, detachably secured to the top 14 by suitable fasteners, not shown, and has preferably a rigidly mounted table 22 fastened thereon as by screws 24, Figure 6, passing through attachment ears 26 provided at the corners of cabinet 20. The table has an accurately machined, plane support surface 28 interrupted by a pair of spaced parallel grooves or channels 30, 32 and a generally, centrally located oblong access opening 34.

A pair of spaced, aligned trunnion brackets 36 and 38 are detachably secured as by bolts 40 to the under side of table 22 adjacent opposite edges thereof and between and at right angles to grooves 30, 32 (see Figures 3 and 6). Each trunnion bracket is formed with an arcuate groove 42, 44 adapted to slidably receive complementary tongues 46 and 48 formed on trunnions 50 and 52, respectively. A pair of parallel tie rods 54 and 56 preferably extend between the trunnions and have reduced and threaded end portions projecting through suitable axially aligned holes in the trunnions. Nuts 58 secured on the threaded tie rod ends integrate the trunnions and tie rods into a structurally rigid support assembly rockably supported by the cooperation of arcuate tongues 46, 48 and grooves 42, 44.

At one end, the tie rods 54 and 56 project substantially beyond the corresponding trunnion 50 to provide a pair of adjacent extensions 60 and 62 (Figure 2), respectively, for supporting a motor assembly indicated generally at 64. Assembly 64 consists of a motor plate 66 pivotally secured as at 68 to a support bracket 70 rigidly mounted on extensions 60 and 62. To this end, the bracket 70 is formed with a pair of spaced parallel bores 72, Figure 2, adapted to receive respective mounting extensions 60, 62 of the tie rods 54 and 56. Set screws 74 are provided to engage in grooves on extensions 60 and 62 one such groove appearing at 76 on the extension 62 (see Figure 3), thereby precluding accidental dislocation of the bracket while permitting easy removal of the motor assembly when necessary. An electric motor 78 or other suitable drive means is secured to plate 66 as by hold-down bolts 80 (Figures 2 and 3). Thus, the entire motor assembly tilts with the support assembly and keeps the belt pulleys, which are provided on the motor spindle and the arbor as will hereinafter appear, in operative alignment in all positions of the support assembly. The weight of the motor tending to pivot plate 66 in a counter-clockwise direction, as viewed in Figure 3, about pintle 68 serves to maintain proper tension in the drive belt connecting such pulleys.

The plate 66 is formed with a portion 69 adapted to abut bracket 70 to limit the downward pivotal movement of the motor to the position shown in broken lines, Figure 3, when the drive belts are removed.

Referring to Figures 2, 3 and 6, a roughly triangular arbor bracket 82 is pivotally mounted at one apex on trunnion 52 by means of a shaft 84 passing through spaced bearing bosses 86 and 88 on the bracket and through a bearing boss 90 projecting from the trunnion and received between bosses 86 and 88. A set screw 92 is provided to preclude accidental dislocation of shaft 84.

Another apex of the triangular bracket 82 is formed with a bearing boss 94, parallel to bosses 86 and 88 and provided with suitable anti-friction bearings, not shown, journalling an arbor 96.

The third apex of the bracket 82 is formed with a worm gear segment 98 in operative engagement with a worm 100 carried on the inner end of an adjustment shaft 102 which is journaled in trunnion 52 and extends through an arcuate slot 104 in the adjacent wall of cabinet 20. A suitable bushing assembly, indicated generally at 105, journals shaft 102 in trunnion 52 and prevents relative axial displacement therebetween. An adjustment knob 106 on the outer end of shaft 102 provides convenient means for rotating worm 100 which causes bracket 82 to pivot about shaft 84 and thereby raise or lower arbor 96.

As best shown in Figure 6, the lower end of trunnion 52 is provided with a worm gear segment 108 operatively engaged by a worm 110 on the inner end of a shaft 112. Shaft 112 is rotatably journalled in a boss 114 formed on a depending leg of trunnion bracket 38 and extends through a suitable aperture in the adjacent side wall of cabinet 20 where it is provided with an adjustment knob 116. Rotation of worm 110 through the medium of knob 116 and shaft 112 drives gear segment 108 causing trunnions 50 and 52 to slide in arcuate grooves 42 and 44 in bracket 36 and 38. Thus, the entire support assembly 50, 52, 54, 56, together with the arbor assembly 82, 96, 102 is tilted as a unit to adjust the angularity of arbor 96 about a horizontal axis lying in the plane of table 22 along the effective axis of trunnions 50, 52. The adjustment provided is such that the axis of arbor 96 can be tilted to an angle of approximately 45° from its normal horizontal position.

As best shown in Figure 6, one end of arbor 96 carries an annular flange or collar 118, which has a running clearance with the adjacent face of boss 94. The end of arbor 96 extending beyond the flange 118 is adapted to mount either a pulley wheel or a cutting tool, such as a circular saw disc or blade 120, molding cutter head, or the like, clamped against the flange by means of a collar or washer member 122 engaged by a nut 124, threaded on the end of the arbor.

With the saw disc 120 so mounted, it is in alignment with and partially projects through access opening 34, which opening is provided with a removable table insert plate 126 marginally shaped to conform to the opening and having a longitudinal slot 128, of proper size and location to accommodate the saw disc 120. By relieving the under side of plate 126 as at 127 to reduce its thickness slot 128 is kept narrow as possible while affording sufficient running clearance for the saw disc in all positions within the range permitted by the tilting of the arbor.

Plate 126 is supported flush with table surface 28 by a number of triangular ears 132 (Figure 6) projecting laterally into the area beneath the opening 34 and having plane upper surfaces spaced below the plane of surface 28 by a distance equal to the thickness of plate 126.

Due to the mounting arrangement for saw discs on the arbor 96 and the removable nature of table insert 126, it is possible to substitute molding cutter heads or dado heads (not shown), in place of saw disc 120 on the arbor. With such heads, alternate table inserts (not shown) are substituted for insert 126. Such alternate inserts are identical to 126 but have slots similar to 128 but generally wider and shorter to accommodate the particular head being used.

The arbor 96 carries a belt pulley 134, irrotatably fixed thereto at the opposite end thereof with respect to flange 118, by means of a key 135 and set screw 137. Arbor 96 is rotatively driven by means of a main drive belt 136, which kinematically links pulley 134 with a copanar pulley 138, on one end of the spindle 140 of motor 78.

Referring to Figures 1 and 2, jointer unit 18 is mounted on a spacer block 19 and has a tool supporting drive shaft 142 (Figures 1 and 2) projecting from the side thereof adjacent cabinet 20. The end of shaft 142 is provided with a suitably attached belt pulley 144. The opposite end of motor spindle 140, carries a pulley 146 drivingly fixed thereto and normally in coplanar relation to jointer pulley 144. A flexible V-belt or like means 148, passing over pulleys 144 and 146, rotatively couples jointer drive shaft 142 to the motor spindle 140.

As in the case of belt 136, belt 148 is properly tensioned by the weight of the motor 78 acting through the pivotally supported mounting plate 66. Both belts may be quickly and easily removed by raising the free end of plate 66, thus slackening the belts sufficiently to slip them off the pulleys.

It is to be noted that, while the saw arbor 96 is in horizontal or neutral (untilted) position both the saw and jointer may be in operation simultaneously. In tilting the saw arbor, it is preferable to slip belt 148 off pulley 146 by the procedure outlined above.

Thus, in precision sawing operations where first a rough cut is made on the saw and then the edge of the work must be planed square to insure that all subsequent cuts will be square, the entire operation may be carried out consecutively without any manipulation or converting adjustment of the unit.

On the opposite side of cabinet 20 with respect to jointer 18, a hinge bracket 150 is secured to the edge of table 22 by bolts 152, as clearly shown in Figures 1, 2, and 5. The bracket 150 is formed with a pair of depending parallel bosses 154 having axially aligned bores paralleling the axis of trunnions 50, 52. A drill press support base 156, formed with a pair of substantially parallel legs 158 and 160 suitably spaced to span bosses 154 and having axially aligned apertures adapted to register with the bores in said bosses, is detachably, pivotally secured to bracket 150 by means of a removable pintle 162 which preferably takes the form of a headed bolt passing through the respective bores in the legs 158, 160 and bosses 154 and fastened by means of a nut, not shown, at its opposite end.

Referring again to Figure 1, a vertically extending boss 164 is formed on base 156 adjacent the opposite edge thereof with respect to the pivotal connection of legs 158, 160 in order to locate the boss at a substantial distance from such connection. The boss 164 contains a bore adapted to receive the lower end of a drill press column or standard 166 which is securely fastened therein as by means of set screws 168 (one shown). Base 156 is also formed with a pad 170, having a plane surface adapted to rest on surface 28 of the table 22 when the drill press is in operative position, as shown in solid line in Figure 1. The pad 170 supports the majority of the weight of the drill press assembly in its operative position. The use of legs 158, 160 and the placement of boss 164 with respect thereto, results in locating the center of gravity of the drill press assembly in a vertical plane which lies well to the left of pintle 162, as viewed in Figure 1. When the assembly is in operative position, therefore, the assembly is extremely stable and there is little danger of the drill press toppling over before it is secured in the manner hereinafter to be described.

Another advantage of this construction resides in the fact the vertical projection of the center of gravity of the drill press assembly falls well within the base of the cabinet 20 and the support stand 10, thus eliminating any tendency to tip either of them. This very desirable stability is achieved without enlarging the base area of the support stand, which, if done, would detract from the compactness of the unit and require a larger floor space.

Still referring to Figure 1, an extension arm 172 is formed on the base 156, on the opposite side of boss 164 with respect to legs 158, 160 which extension has an angulated terminal portion 174 containing an aperture threaded to receive a knurled-headed thumb-screw 176. The end of screw 176 opposite the knurled head carries an annular flange 178, which cooperates with the adjacent edge of opening 34 when the screw is threaded upwardly positively to lock the drill press in upright position on the table 22. Threaded downwardly, the screw moves flange 178 out of engagement with the edge of the aperture to a position in which it will clear said edge when the drill press is swung to the inoperative position shown in broken lines, Figure 1.

Mounted on the drill press column 166 is a drill head, indicated generally as 180, having a main frame or body member 182 containing a through bore 184 adapted to receive the column or post 166.

The portion of frame 182 adjacent bore 184 is split or slotted as at 186 (Figure 2), such slot intersecting the adjacent wall of bore 184 at a diameter thereof. The sections of frame 182 on opposite sides of the slot are drawn together as by nut and bolt assembly 188 to clamp the halves of the bore securely to the column. Upon loosening of the nut and bolt assembly frame member 182 may be moved along the column 166 to adjust the drill head 180 to any convenient level. A suitable work support table 190 is likewise adjustably mounted on the drill press column and may be swung to the position shown in broken lines, Figure 1, so as not to interfere with support 10 when the drill press is swung to inoperative position.

At its opposite end with respect to bore 184, frame 182 is provided with an additional bore 192 parallel to bore 184 and axially slidably receiving a quill 193 rotatably journalling a drill spindle 194 therein by means of suitable anti-friction bearings, not shown. The lower end of the spindle, as viewed in operative position in Figure 1, is provided with a conventional adjustable chuck 196 for positioning and driving drill bits, or miscellaneous other rotary tools which are moved perpendicularly toward and away from table 190 by means of a lever 197 operative through shaft 199 to slide quill 193 in bore 192 in the conventional manner well known in the art. At its upper end, the spindle 194 is provided with a step pulley 198 drivingly secured thereto. The pulley 198 is illustrated as having steps or lands of four diameters but it will be appreciated that any reasonable number and range of diameters may be used to achieve a greater or lesser range of speed ratios. A safety shield or housing 200 removably secured to frame 182 by any suitable means, not shown, substantially encloses the step pulley 198 but is open at the rear to accommodate passage of a drive belt.

Referring now to Figures 1, 2 and 4, the frame 182 is formed with a pair of oppositely extending bosses 202 adjacent the bore 184. These bosses contain parallel bores adapted to receive the ends of stub shafts 204 secured therein by set screws 206. A T-shaped support plate 208 (Figure 4) is rigidly secured to the stub shafts 204, which pass through suitable apertures in the plate and are reduced in diameter and threaded to be engaged by nuts 210 to clampingly secure plate 208 to the projecting ends of shafts 204.

An idler pulley bracket 212 having a pair of axially aligned slots 214 is adjustably secured to the tree portion of plate 208 by means of headed bolts 216, having washers 217, passing through the slots 214 and engaging in suitable tapped holes in the plate. The upper end of the bracket is formed with a boss 218, apertured in a direction paralleling the plane of the axes of stub shafts 204 to receive a pulley axle 220, on the opposite ends of which are mounted a pair of idler pulleys 222.

The drill press spindle is driven by means of a flexible V-belt 223 or similar means running over step pulley 198, guided by idlers 222 and driven from the arbor 96 by means now to be described, preferably replacing saw blade 120. It, however, is to be understood that collar 118 could be suitably formed to form the drive means if desired.

For operation of the drill press, the arbor, if tilted, is returned to neutral position and the insert 126 removed. The saw disc is then preferably demounted by removal of nut 122 and washer 124, and replaced by a drive pulley 224 (Figure 1), held in position against collar 118 by the same nut and washer.

The drill press is then swung to upright position and locked by thumb screw 176 and the drive belt 223 is passed around whichever land on step pulley 198 will produce the desired speed ratio between the arbor 96 and the drill spindle 194. The belt is run over idler pulleys 222, and the free loop or bight dropped through access opening 34 in the table 22. By turning knob 80, the arbor 96 is raised, in the manner which has already been described, to a height sufficient to allow the end of belt 223 to be passed over the end of the arbor and onto pulley 224, whereupon the arbor is lowered to produce the desired tension in the belt.

The arbor height adjustment is also used to yield or take up slack in belt 223 when made necessary by changing the speed ratio on the step pulley and to adjust belt tension generally when required.

The idler pulley assembly provides two degrees of adjustment. By loosening set screws 206, the idlers may be adjusted horizontally in order to align the vertical run of the belt 223, with pulley 224, while by loosening bolts 216, the idlers may be raised or lowered to align the horizontal run of the belt with whichever land on step pulley 198 is in use.

The tension in belt 223 assists in maintaining the drill press in operative position on the table, relieving strain on thumb screw 176, the primary locking means. Despite the inherent stability characteristics of the drill press resulting from the particular manner in which it is secured to the table 28, described above, an unusual force placed thereon before or during the installation of belt 223 may cause it to fall over and therefore, as a precautionary measure, it should be locked by means of screw 176 preferably prior to such installations and in all events during operation of the drill press.

Referring now to Figure 5 the combination unit is shown arranged for operation as a wood lathe, disc sander, and the like. The drill press assembly is swung to inoperative position and a double ended spindle support structure and tool rest, indicated generally at 226 and 228, respectively, are installed on the support table 22.

The unit 226 consists of a rectangular base plate 230, having an oblong belt clearance opening 232 close to and parallel with one edge thereof, which opening is preferably somewhat smaller than and centrally disposed over access opening 34 when the base plate is installed on table 22 as shown in Figure 7. The underside of the base plate is formed with three mounting pads, two of which, 234 and 236, are at the corners remote from opening 232, and a third, 238, adjacent to and substantially midway between the ends of the side edge adjacent opening 232. These pads support the base on the table surface providing the stability characteristic of three-point mountings so that the base will not rock or jiggle even if it is not perfectly true. This eliminates the extremely close manufacturing tolerances which would be required for making the base and machining the pads if four or more pads were used.

On the base plate 230 a substantially hollow frame member 240 is secured as by means of a number of headed bolts 242 passed upwardly through aligned holes in the plate and frame member and secured by nuts 244 (one shown, Figure 5).

The upper surface of the frame 240, carries a raised, semi-cylindrical boss 246 apertured to journal a spindle 248 carrying a belt pulley 250, located directly over opening 232. The section of spindle 248 carrying pulley 250 is formed with a "flat" 251 (Figure 9) engaged by a set screw 253 in the pulley to prevent the pulley from rotating on the spindle. The "flatted" section 251 of the spindle extends a substantial distance beyond the pulley for a purpose which will hereinafter appear.

The opposite end of spindle 248, extends a short distance from the boss and is similarly provided with a "flat" 252 adapted to mount a sanding disc 254 non-rotatably secured to the spindle by means of a set screw 255 engaging the "flat." The back of the sanding disc carries radial reinforcing ribs or webs 256, while the front carries a plane circular working surface 257 on which are placed replaceable abrasive discs, not shown, as is well-known in the art.

An apron or work support 258 is pivotally mounted on frame 240 adjacent the surface 257 of the disc which apron is angularly adjustable about a horizontal axis parallel to the surface. A thumb screw 260, working in arcuate slot 262 in the apron 258, locks it in adjusted position.

Referring now to Figures 7 and 8, the underside of the base plate 230 is formed with a plurality of reinforcing ridges 263 and a pair of parallel, depending ribs 264 running transversely to and spaced inwardly from the ends of opening 34. Ribs 264 extend equal distances to each side of the longitudinal center line of opening 232, and are so disposed as to fit into and abut the marginal edges of the rounded ends of oblong aperture 34, the ends of the ribs having a radius 266 complementary to the curve of the adjacent marginal edges of the aperture 34. The coaction between the ribs 264 and the edges of the aperture, quickly and accurately locates the unit 226 in proper position on the table, i. e., with pulley 250 directly over and aligned with pulley 224 on arbor 96 and further prevents horizontal dislocation thereof. The spindle is driven and the unit is held down on the table by a drive belt 268, which is installed by raising the arbor 96 in the manner already described, slipping the belt over the ends of horizontal spindle 248 and arbor 96, onto pulleys 224 and 250, and then lowering the arbor to tension the belt.

The end of spindle 248 opposite disc 254 is adapted to mount various tools such as buffing wheels, grind wheels, sanding drums, scratch brushes and the like represented generally by discoid shape 270, for performing a wide variety of operations.

Such implements are attached to the spindle 248 by means of an extension shaft 267 carrying a socket 269 at one end and a "flat" 271 at the other. Socket 269 is adapted to receive the end of spindle 248 and carries a pair of set screws 273 which engage flat 251 to lock the extension shaft on the spindle.

The rotary implements represented by discoid shape 270 may be secured to the extension shaft 267 by a suitable means such as nut 275. In order to prevent rotation of such implements relative to the extension shaft, the mounting centers thereof may have a "flat" complementary to flat 271 or may be provided with set screws (not shown) adapted to engage the latter flat.

In addition, a suitable drill chuck, not shown, may be mounted directly on the spindle in place of extension shaft 267 thereby providing a horizontal drilling machine. The same end of the spindle 248 may be used for simple wood turning by means of a lathe face plate or chuck (not shown) mounted on shaft 248 in place of extension shaft 267 or on shaft 267 in the same manner as the various implements mentioned above.

The tool or work rest 228 is provided for use in conjunction with the wheel or work mounted on the spindle 248 and comprises a base 272 having a vertically extending boss 274 at one end supporting a tool or work rest proper indicated at 276. The rest has a cylindrical tenon 278 extending into a vertical bore in boss 274 and is adjustably and removably secured therein by means of a manual screw member 280. By loosening the screw member 280, the support can be raised or lowered and/or angularly adjusted about a vertical axis in well known manner.

Rest 228 may be mounted on table 22 in any suitable manner, for example, by means of an attachment plate 282 fixedly held on surface 28 of the table magnetically, by nuts and bolts, or the like and having a vertical stud bolt (not shown) projecting from its upper surface, through slot 284 in the base of the rest and engaged by a clamp nut 286.

The manner in which the various components are brought into operative position and connected to the power source has been described in the foregoing description. Once placed in operation, the various tools are used in the same manner as comparable individual tools. It is to be noted that conversion in the tool of this invention is a step by step process following the natural sequence of basic woodworking operations. In precision sawing, no conversion is necessary as has already been explained. The next step in the natural sequence is drilling which requires the substitution of pulley 224 on arbor 96 for the saw disc 120, the erection of the drill press, and the installation of drive belt 223. The next step in the natural sequence involves finishing operations such as sanding, buffing, etc. Advantageously, the conversion for such finishing operations are partially completed by the installation of pulley 224 for the drill press. Therefore, all that remains to be done is to swing the drill press off the table, place unit 226 thereon and install belt 268 in the manner already described. Thus, in fact only two conversions are necessary which conversions are performed according to the natural sequence of operations so that the first conversion prepares the unit for and partially completes the second. As a result, approximately 98% of home-shop operations may be performed by two simple conversions of an apparatus occupying, in the described embodiment, only a three foot square floor space.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A combination power tool comprising a conventional machine tool having a support cabinet, a table top of limited area provided with an enlarged tool opening, a motor and driven arbor mounted in said cabinet beneath said table top with one end of said arbor beneath said tool opening, means drivingly connecting said motor to the other end of said arbor, and means adapting said one end of said arbor to selectively receive a rotary tool to condition said machine tool for conventional normal marketing as a self contained power tool or a pulley member to condition said machine tool for auxiliary use as a power source and support table for selected work performing power tools differing from that of said conventional power tool; a pulley member on said one end of said arbor; an attachment power tool unit comprising a support base, means adapting said support base to removably position said attachment machine tool in operative relation to said tool opening on said table top, a rotatable spindle mounted on said support base and carrying a rotary cutting tool at one end and pulley means at its other end for driving said rotatable spindle; and belt means interconnecting said pulley member and said pulley means through said tool opening adapted upon lowering movement of said motor and arbor to both drive said rotatable spindle and cooperate with said means adapting said support base to removably position said attachment machine tool in operative relation to said tool opening on said table top to effectively hold said attachment machine tool in operative position on said table top.

2. A combination power tool comprising a self contained motor powered circular saw unit including a stationary horizontal work table having an elongated aperture therein; a rotatable arbor mounted beneath said table, one end of said arbor being adapted to be drivingly connected to a source of rotary power, the other end of said arbor being adapted to selectively drivingly mount a rotary tool or pulley means in subjacent relation to said aperture; pulley means removably fixed to said other end of said arbor; an attachment machine tool, including a rotatable spindle and a base having means engaged with the aperture defining portion of said work table, removably supported by said table with said spindle located above said table, said base being secured against relative lateral shifting with respect to said table aperture by said means engaging the aperture defining portion of said work table; belt drive means drivingly connecting said pulley means to said spindle through said aperture and arranged to drive said spindle at proper operating speed; and means operable to raise and lower said arbor to tension said belt drive means adapting it to both drive said spindle and cooperate with said means engaging the aperture defining portion of said work table to effectively maintain said attachment machine tool in operative position.

3. The combination defined in claim 2 wherein the attachment machine tool base means engaging said table aperture releasably grips an edge of the aperture defining table portion to retain said attachment machine tool in operative relation to said table aperture.

4. The combination defined in claim 2 wherein said attachment machine tool comprises a housing of conventional form, adapting said attachment tool for marketing as a separate tool, supported by said base resting on said table and spindle journal means normally journalling said spindle horizontally and rotatably in said housing and wherein said means engaging the aperture defining portion of said work table comprises a protruding element on the underside of said base cooperating with said aperture and belt drive means to position said attachment machine tool on said saw unit work table with said spindle substantially parallel to and directly above said arbor.

5. A combination power tool comprising a self contained motor powered circular saw unit including a stationary horizontal work table having an elongated aperture therein; a rotatable arbor mounted beneath said table, one end of said arbor being adapted to be drivingly connected to a source of rotary power, the other end of said arbor being adapted to selectively drivingly mount a rotary tool or pulley means in subjacent relation to said aperture; pulley means removably fixed to said other end of the arbor; a drill press, including a rotatable spindle and a base, removably supported by said table with said spindle in operative relation to said table aperture, said base being secured adjacent one edge of said work table for pivotal movement of said drill press between an upright operative position on said table and a completely inoperative, inverted position off said table; belt drive means drivingly connecting said pulley means to said spindle; and means operable to raise and lower said arbor to tension said belt drive means adapting it to both drive said spindle and maintain said drill press in operative position.

References Cited in the file of this patent

UNITED STATES PATENTS

| | | |
|---|---|---|
| 298,056 | Bean | May 6, 1884 |
| 448,195 | Barnes | Mar. 17, 1891 |

(Other references on following page)

UNITED STATES PATENTS

| | | | |
|---|---|---|---|
| 511,618 | Hurteau | Dec. 26, | 1893 |
| 750,897 | Russell | Feb. 2, | 1904 |
| 989,285 | Parks | Apr. 11, | 1911 |
| 1,524,224 | Werner | Jan. 27, | 1925 |
| 1,803,402 | Napier | May 5, | 1931 |
| 1,834,684 | Dannehower | Dec. 1, | 1931 |
| 1,982,254 | Juengling | Nov. 27, | 1934 |
| 2,016,528 | Wilson | Oct. 8, | 1935 |
| 2,121,069 | Collins | June 21, | 1938 |
| 2,505,658 | Wilson | Apr. 25, | 1950 |
| 2,542,373 | Tollafield | Feb. 20, | 1951 |
| 2,627,288 | Steiner | Feb. 3, | 1953 |
| 2,661,037 | McGihon | Dec. 1, | 1953 |

FOREIGN PATENTS

| | | | |
|---|---|---|---|
| 3,241 | Italy | June 14, | 1872 |
| 3,870 | Great Britain | Feb. 18, | 1903 |
| 14,881 | Great Britain | Oct. 16, | 1888 |
| 45,934 | Germany | Jan. 23, | 1889 |
| 108,123 | Switzerland | Dec. 16, | 1924 |
| 686,994 | Great Britain | Feb. 4, | 1953 |